(12) United States Patent
Wang et al.

(10) Patent No.: US 11,240,290 B2
(45) Date of Patent: Feb. 1, 2022

(54) APPLICATION DOWNLOAD METHOD AND APPARATUS, APPLICATION SENDING METHOD AND APPARATUS, AND SYSTEM

(71) Applicant: Huawei Technologies Co., Ltd., Shenzhen (CN)

(72) Inventors: Xingnan Wang, Shenzhen (CN); Guoqiang Li, Hangzhou (CN); Fan Zhang, Shenzhen (CN); Zhiqiang Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/011,466

(22) Filed: Sep. 3, 2020

(65) Prior Publication Data

US 2020/0404046 A1   Dec. 24, 2020

Related U.S. Application Data

(63) Continuation of application No. PCT/CN2019/104308, filed on Sep. 4, 2019.

(30) Foreign Application Priority Data

Oct. 15, 2018   (CN) .......................... 201811198506.2

(51) Int. Cl.
*G06F 15/173* (2006.01)
*H04L 29/08* (2006.01)
*H04W 8/24* (2009.01)

(52) U.S. Cl.
CPC .............. *H04L 67/06* (2013.01); *H04L 67/32* (2013.01); *H04L 67/34* (2013.01); *H04W 8/245* (2013.01)

(58) Field of Classification Search
CPC ......... H04L 67/06; H04L 67/34; H04W 8/245
See application file for complete search history.

(56) References Cited

U.S. PATENT DOCUMENTS

| | | | | |
|---|---|---|---|---|
| 2013/0260739 | A1* | 10/2013 | Saino | G06F 9/547 455/419 |
| 2013/0268437 | A1* | 10/2013 | Desai | G06Q 20/08 705/41 |
| 2014/0020068 | A1* | 1/2014 | Desai | G06Q 20/40 726/4 |
| 2014/0089113 | A1* | 3/2014 | Desai | G06Q 20/3278 705/16 |
| 2014/0351301 | A1 | 11/2014 | Yandek et al. | |

(Continued)

FOREIGN PATENT DOCUMENTS

| | | |
|---|---|---|
| CN | 103049452 A | 4/2013 |
| CN | 105608167 A | 5/2016 |

(Continued)

*Primary Examiner* — Thanh T Nguyen
(74) *Attorney, Agent, or Firm* — Conley Rose, P.C.

(57) ABSTRACT

An application download method for a download-to-start application includes obtaining, by a server, runtime information of an application from a large quantity of terminals that have downloaded and used the application, performing data analysis on the information, determining a sequence of application files based on a result of the data analysis, to arrange an application file with a high access probability in front of an application file with a low access probability, and transmitting the application files to a terminal device based on the sequence.

20 Claims, 11 Drawing Sheets

(56) References Cited

U.S. PATENT DOCUMENTS

2015/0302398 A1* 10/2015 Desai ................... G06Q 20/367
                                                      705/41
2015/0365350 A1    12/2015 Xu et al.

FOREIGN PATENT DOCUMENTS

| CN | 106325908 A | 1/2017 |
| CN | 106775838 A | 5/2017 |
| CN | 107038044 A | 8/2017 |
| CN | 107122201 A | 9/2017 |
| CN | 107395616 A | 11/2017 |
| CN | 108111555 A | 6/2018 |

* cited by examiner

APPLICATION DOWNLOAD METHOD AND APPARATUS, APPLICATION SENDING METHOD AND APPARATUS, AND SYSTEM

CROSS-REFERENCE TO RELATED APPLICATIONS

This application is a continuation of International Patent Application No. PCT/CN2019/104308 filed on Sep. 4, 2019, which claims priority to Chinese Patent Application No. 201811198506.2 filed on Oct. 15, 2018. The disclosures of the aforementioned applications are hereby incorporated by reference in their entireties.

TECHNICAL FIELD

This application relates to the field of computer technologies, and in particular, to an application download method and apparatus, an application sending method and apparatus, a system, and the like.

BACKGROUND

Currently, a new application form, that is, an applet, emerges on a smartphone, and includes but is not limited to a WECHAT applet, an ALIPAY applet, a QUICK APP, and the like. An essential difference between the applet and a conventional mobile phone application lies in that the applet does not need to be downloaded from an application market or an application provider for installation, but directly reaches a user in a manner such as recommendation, search, or sharing, and the user taps to use the applet. The applet needs to complete an entire process including download, installation, and startup in a moment when the user opens the applet to use (the applet starts up immediately after download). However, due to a relatively large (from several megabytes to several hundreds of megabytes) file package (including a plurality of files) of the applet, and a latency caused by redirection, link establishment, transmission consumption, a packet loss, and the like in a network transmission process, user experience of opening the applet is extremely poor, and the user may have to wait several seconds or even dozens of seconds.

In a process of starting an application immediately after download, how to provide a startup speed that satisfies user experience requirements is a current technical problem. The technical problem is not limited to an application scenario of the applet, and may be extended to any application that needs to be immediately started after download, for example, a tap-to-use applet, a tap-to-play game, real-time loading of a resource package in a game scenario, and loading of an artificial intelligence (AI) model file.

There are mainly two types of technical means for resolving this technical problem: package splitting and pre-download.

The applet is used as an example. A developer groups a plurality of files of the applet into different groups, and packages these groups into different subpackages when building a file package, and the user loads the subpackages as needed. A package splitting solution of a WECHAT applet is used as an example. When an applet package splitting project is constructed, one or more function subpackages are output, including a main package. The main package includes a default startup page/TabBar page and some common resources/JAVASCRIPT (JS) scripts required by all the subpackages. The subpackages are usually grouped according to the developer's configuration. When the applet starts, the main package is downloaded by default and a page in the main package is started. When the user needs to open a function (or page) in a subpackage, a client downloads the corresponding subpackage and displays the function (or page) after the download is completed. Compared with an entire file package, the main package is smaller and has a lower download latency. For a user, a startup speed of the applet is higher such that user experience is better. However, the package splitting solution still has the following disadvantages. All the common resources that may be used by a plurality of subpackages need to be put in the main package, but not all the common resources are resources required for initial startup. If there are excessive common resources, the main package is oversized, resulting in time-consuming initial startup.

Pre-download of a file package includes pre-downloading a to-be-accessed file package and buffering the file package in a terminal device. When the user opens a corresponding applet, the file package is directly loaded from a buffer and executed. This eliminates a latency of downloading the file package. However, the pre-download of the file package also has the following disadvantages. The pre-download needs to be performed in an application scenario (a page of an application or an execution state) before the applet starts, but not all scenarios support the pre-download. For example, an applet is started by software developed by a third party, but the third-party software cannot be forcibly required to execute download logic in advance. The pre-download may be performed unexpectedly by mistake, and when a user does not actually use the buffered applet package, corresponding download traffic and storage space are wasted.

SUMMARY

This application provides an application download method and apparatus, an application sending method and apparatus, and a system, to improve efficiency of starting and running an application, thereby improving user experience.

The following describes this application from a plurality of aspects. It is easy to understand that, for implementations and beneficial effects of the following plurality of aspects, reference may be made to each other.

According to a first aspect, this application provides an application download method, performed by a terminal device, and including collecting runtime information of an application and sending the runtime information to a server, where the runtime information is related to access to a plurality of application files in the application, and includes, for example, one or two of the following information a quantity of access times of each of the plurality of application files, and an access sequence of the plurality of application files, and receiving the plurality of application files sent by the server based on a transmission sequence, where the transmission sequence is a sequence determined by the server based on the runtime information.

This download method is usually streaming download. To be specific, the server provides continuous and real-time application file download using a network, and the terminal device can start the application with no need to wait for completion of download of all the application files. Since the terminal device can use a file before all the files are downloaded, how to ensure that a file download sequence meets a user requirement, to be specific, how to download, as soon as possible, a file required by a user in a next step, is crucial. In this application, information such as the quantity of access times of the application file is analyzed and processed such that an application file sequence that better suits a usage habit of the user can be obtained, and with reference to a streaming download method, efficiency of starting and running the application is improved, thereby improving user experience.

In some implementations, the plurality of application files have an initial sequence, the initial sequence is determined based on a reference relationship between the files, and the reference relationship between the files is generated by statically scanning the plurality of application files and pre-executing the plurality of application files. In some other implementations, the reference relationship between the files is generated by only statically scanning the plurality of application files, or the reference relationship between the files is generated by only pre-executing the plurality of application files.

A plurality of application files is deployed on a server based on an initial sequence, and the initial sequence is generated by statically scanning the plurality of application files and pre-executing the plurality of application files. The initial sequence may be completed by a developer on a personal computer, or may be completed by a developer using a capability provided by the server. To be specific, the server can scan and pre-execute the plurality of application files.

The initial sequence may be used to obtain the reference relationship between the application files, and provide a basis for subsequent sorting. A reference relationship between some files may not be obtained using static scanning, and a more comprehensive reference relationship between the application files can be obtained using both the static scanning and pre-execution.

In some implementations, before performing the receiving step, the terminal device sends personalized user information to the server, where the personalized user information includes one or more of the following information a current location of the terminal device, an identifier of a user of the terminal device, and an identifier of a specific file of the terminal device, and the transmission sequence is determined by the server based on the runtime information and the personalized user information.

In addition to the runtime information of the application, the transmission sequence may be further determined with reference to the personalized information of the terminal device, for example, location information of the terminal device, such as at home or in a company. Even a same user may have different usage habits for the same application at different locations. To be specific, access sequences of the application files and/or quantities of access times of each application file are different at different locations. Alternatively, the terminal device has a plurality of users, and the plurality of users have different usage habits for the same application. Therefore, the personalized user information is used to differentially sort the application files. For example, a location A corresponds to a sequence A, and a location B corresponds to a sequence B. In this way, sorting of the application files can be more targeted, and precision of sorting of the application files is further improved.

In some implementations, in a process of receiving the plurality of application files sent by the server based on a transmission sequence, the method further includes sending a file request to the server, where the file request is used to request to download a requested file that has not been sent by the server, and receiving the requested file sent by the server in real time.

In a process of receiving the application files, because the file sequence has been determined in advance, a case of temporarily requesting a file that has not been downloaded may exist. If such a case exists, the terminal device sends a request for requesting the file to the server, and the server sends the file to the terminal device in real time.

When such a case occurs, the file sequence may be directly adjusted, and a sending priority of the file is raised to a current highest priority. Alternatively, the sequence of the application files may not be adjusted (the file is sent in advance only this time). In some other implementations, the server collects the foregoing file requests, analyzes the file requests, and adjusts the file sequence only when a specific condition is met. To be specific, an occasional file request that does not conform to an original sequence has slight impact on the global sequence. If a large quantity of such file requests is collected, adjustment on the global sequence is triggered.

According to a second aspect, this application further provides an application sending method, performed by a server, and including obtaining runtime information of an application, where the application is an application that is running or has run on a terminal device, and the runtime information includes one or two of the following information a quantity of access times of each of a plurality of application files, and an access sequence of the plurality of application files, determining a transmission sequence based on the runtime information, and transmitting the plurality of application files to the terminal device based on the transmission sequence.

The server obtains the runtime information of the application, and determines the sequence of the application files based on the runtime information of the application such that the sequence of the application files better suits a usage habit of a user. The sorted application files are sent to the terminal device one by one such that a waiting time of a user can be avoided or reduced as much as possible, efficiency of starting and running the application is improved, and user experience is improved.

In some implementations, the plurality of application files have an initial sequence, the initial sequence is determined based on a reference relationship between the files, and the reference relationship between the files is generated by statically scanning the plurality of application files and pre-executing the plurality of application files. The initial sequence may be determined by the server, or may be determined on a development-side computer of a developer.

In some implementations, determining a transmission sequence includes analyzing one or two of access probabilities of the application files and dependency relationships between the application files, and determining the transmission sequence based on the access probabilities and/or the dependency relationships. Further, the access probabilities of the application files and the dependency relationships between the application files may be obtained by big data statistics.

The access probability reflects a possibility that an application file is to be used. The dependency relationship reflects the reference relationship between the application files, or reflects a dependency relationship exists between the plurality of application files in a running process although no explicit reference relationship exists.

In some implementations, before the transmission of the plurality of application files is completed, the method further includes receiving a file request sent by the terminal device, where the file request is used to request to download a requested file that has not been transmitted based on the transmission sequence, and transmitting the requested file in real time based on the file request.

In some implementations, the method further includes if a quantity of received file requests exceeds a preset threshold, adjusting the transmission sequence to improve a transmission priority of the requested file. That is, if relatively more real-time requests for an application file are received (transmission of the file has not been completed) in a process of transmitting the application files, it indicates that transmission of the application file lags behind usage of the user, and therefore, a transmission priority of the file needs to be improved. Further, a priority of the application file in all the application files may be raised based on a preset value, or a priority of the application file in all the application files may be raised based on the preset threshold.

In some other implementations, when such a file request is received, the sequence of all the application files is adjusted in real time, to raise the priority of the application file requested in the file request.

In some implementations, the method further includes obtaining personalized user information of the application, where the personalized user information includes one or more of the following information: a location of the terminal device, an identifier of a user of the terminal device, and an identifier of a specific file of the terminal device, and determining a transmission sequence includes determining the transmission sequence based on the personalized user information and the runtime information.

In some implementations, determining the transmission sequence based on the personalized user information and the runtime information includes calculating access probabilities, of each application file, respectively corresponding to different locations of the terminal device, and/or dependency relationships, between the application files, respectively corresponding to the different locations of the terminal device, to determine a plurality of types of transmission sequences respectively corresponding to the different locations of the terminal device. Transmitting the plurality of application files to the terminal device includes obtaining a current location of the terminal device, and transmitting the application files to the terminal device based on a transmission sequence corresponding to the current location.

The personalized user information is used to distinguish different terminal devices or different users, or distinguish different states and the like of a same terminal device or user. These may affect usage of the application files. For example, a same user may have different usage habits for a same application at different places. Therefore, when the application files are sorted, sorting of the application files may be more targeted with reference to the information. When the application files are transmitted, a corresponding sequence also needs to be selected based on current personalized user information, to transmit the application files based on the sequence such that the sequence better suits a current usage scenario or a usage habit of the user, and user experience is improved.

In some implementations, adjusting the sequence is to change a storage sequence of all the files, that is, a sequence of the files on a storage medium is changed. In some other implementations, the transmission sequence of the files may be considered as a transmission instruction received by a transmission module of the server, and the files are transmitted based on the sequence indicated in the transmission instruction. Therefore, adjusting the sequence is only modifying the instruction to be sent to the transmission module such that the transmission module can transmit the files based on a new sequence.

According to a third aspect, this application further provides an application download apparatus, including a plurality of function units, to implement any one of the first aspect or the implementations of the first aspect. The function units may be divided based on an actual requirement. This is not limited in this application.

According to a fourth aspect, this application further provides an application sending apparatus, including a plurality of function units, to implement any one of the second aspect or the implementations of the second aspect. The function units may be divided based on an actual requirement. This is not limited in this application.

According to a fifth aspect, this application further provides a terminal device, including a processor, a receiver, a transmitter, and a memory, where the memory is configured to store a computer readable instruction, the processor is configured to read the computer readable instruction to perform some or all steps in any one of the first aspect or the implementations of the first aspect, the receiver is configured to receive data (for example, an application file) from the outside (for example, a server) of the terminal device, and the transmitter is configured to send data (for example, runtime information, an application startup request, personalized user information, and a file request) to the outside.

According to a sixth aspect, this application further provides a server, including a processor, a receiver, a transmitter, and a memory, where the memory is configured to store a computer readable instruction, the processor is configured to read the computer readable instruction to perform some or all steps in any one of the second aspect or the implementations of the second aspect, the receiver is configured to receive data (for example, runtime information, an application startup request, personalized user information, and a file request) from the outside (for example, another server or a terminal device) of the server, and the transmitter is configured to send data (for example, an application file) to the outside.

It should be noted that the receiving or sending (or transmitting) step mentioned in the foregoing aspects is implemented through cooperation between a software module and a transmitter or a receiver of hardware. No substantial improvement is made to the hardware part in this application. Therefore, corresponding software modules are described when some embodiments of this application are described. The software module is executed by the processor, and after the execution, an instruction is sent to the receiver or the transmitter of the hardware, to enable the receiver or the transmitter to complete a receiving or sending function according to the instruction of the software module.

According to a seventh aspect, this application provides a computer program product (or referred to as a computer program), including a program instruction. When the program instruction is executed by one or more processors, some or all steps in any one of the first aspect or the implementations of the first aspect are implemented.

According to an eighth aspect, this application provides a computer program product (or referred to as a computer program), including a program instruction. When the program instruction is executed by one or more processors, some or all steps in any one of the second aspect or the implementations of the second aspect are implemented.

According to a ninth aspect, this application provides a computer storage medium, including a program instruction. When the program instruction is executed by one or more processors, some or all steps in any one of the second aspect or the implementations of the second aspect are implemented.

According to a tenth aspect, this application provides a computer storage medium, including a program instruction.

When the program instruction is executed by one or more processors, some or all steps in any one of the first aspect or the implementations of the first aspect are implemented.

According to an eleventh aspect, this application provides an application transmission system, including a server and a terminal device. The terminal device receives a plurality of application files of an application, and starts and runs the application, and sends runtime information of the application to the server, where the runtime information includes one or two of the following information a quantity of access times of each of the plurality of application files, and an access sequence of the plurality of application files. The server is configured to receive the runtime information, determine a transmission sequence based on the runtime information, and transmit the plurality of application files to the terminal device based on the transmission sequence such that the terminal device starts and runs the application again.

BRIEF DESCRIPTION OF DRAWINGS

To describe some of the technical solutions provided in this application more clearly, the following briefly describes the accompanying drawings. The accompanying drawings in the following description show only some embodiments of this application.

BRIEF DESCRIPTION OF EMBODIMENTS

Before the embodiments of this application are described, several concepts that may occur in the embodiments of this application are first described. It should be understood that the following concept explanations may be limited due to a specific case in a specific embodiment, but it does not indicate that this application is limited to the specific case. The following concept explanations may also vary with specific cases in different embodiments.

In the embodiments, application files are a plurality of files required for starting and running an application, and include a file necessary for starting the application, a file required for running each function of the application after the application is started, and the like. The application files may be deployed in a plurality of manners, for example, directly deployed in a terminal device. For example, for an application pre-installed on a mobile phone, the terminal device may directly start and run the application without downloading the files. However, in the embodiments, the application files are released by an application developer on a server (usually released in a form of a file package). The terminal device downloads these files from the server only when needing to start the application, and can run the application only after downloading some of the files.

A file package refers to a file formed by aggregating a plurality of files. In an implementation, each file is separately compressed before being aggregated, and then a plurality of compressed files is aggregated. A file package of an application refers to a file formed by aggregating a plurality of files of the application.

A device side refers to a terminal device or software (for example, client software) running on a terminal device.

A cloud side, or referred to as a network side, usually includes one or more servers, and the device side may access specific data or a specific service on the cloud-side server through a network.

Streaming download is a continuous and real-time download manner provided using a network, and content can be used without being downloaded completely.

The following describes a plurality of embodiments of the technical solutions provided in this application based on the accompanying drawings.

Figure 1:
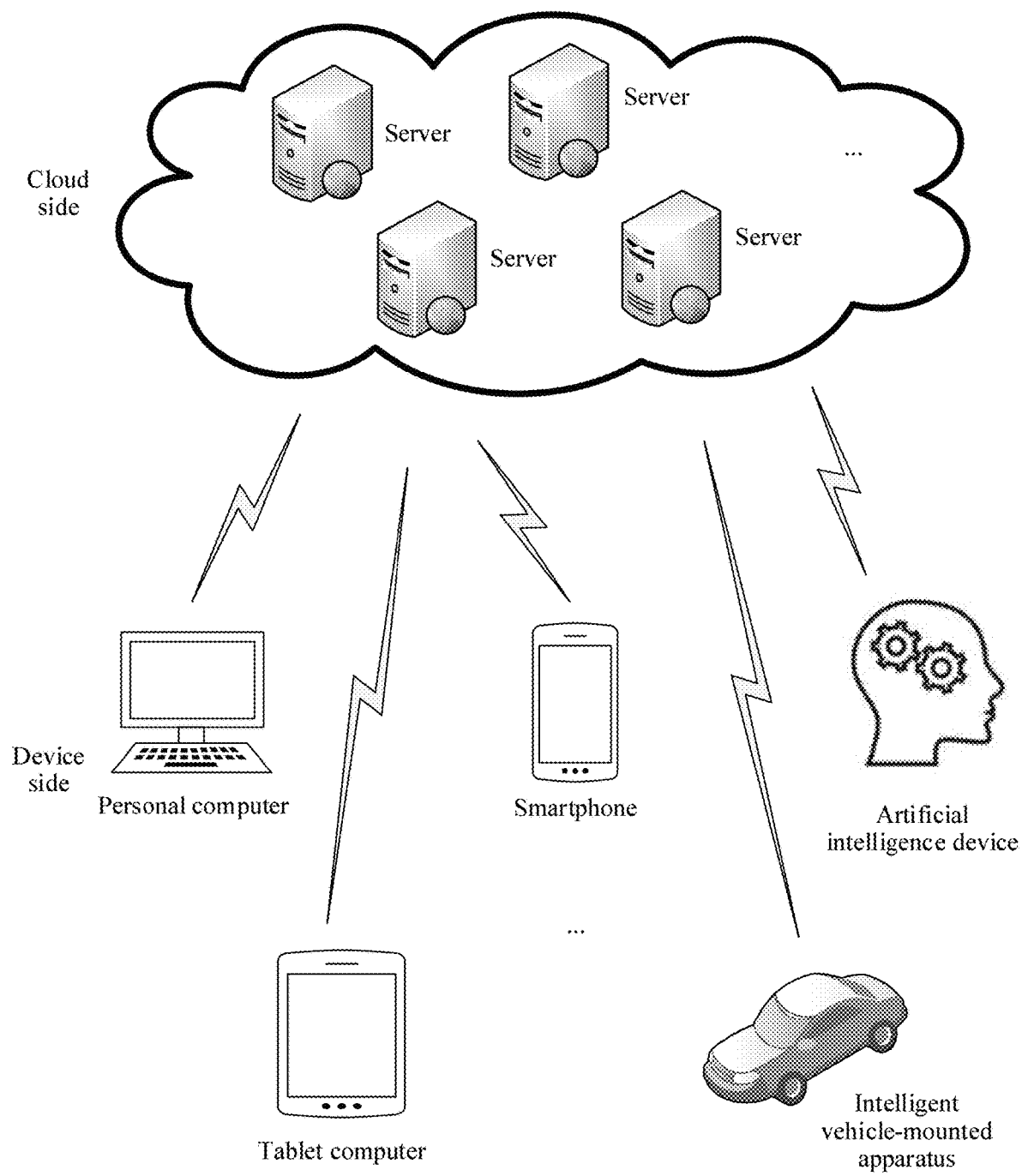
FIG. 1 is a schematic diagram of a network architecture to which the embodiments are applied.

FIG. 1 is a schematic diagram of a network to which the embodiments are applied. Some methods in the solutions provided in the embodiments may be applied to various devices on a device side shown in the figure, for example, a personal computer, a smartphone, a tablet computer, an intelligent vehicle-mounted apparatus, and an artificial intelligent device. Other methods in the solutions provided in the embodiments may be applied to a server on a cloud side. There are many types of servers. A method may be implemented by one server, or may be implemented by a plurality of servers in a distributed manner. One server may refer to one physical apparatus, or refer to a virtualization device to which a virtualization technology is applied. The device on the client side and the device on the cloud side establish communication using a wired or wireless network technology.

In addition, some of the solutions provided in the embodiments are implemented at an application development phase. An application is usually developed by an application provider on a device of the application provider, and after the development is completed, the application is deployed on a service provided by the cloud side. This is used as an example to describe the embodiments below. However, in some other embodiments, if the server on the cloud side or the device on the device side also has a capability of building an application, the method (for example, a development-side initial sorting method mentioned below) provided in the embodiments may also be used during application building.

Figure 2:
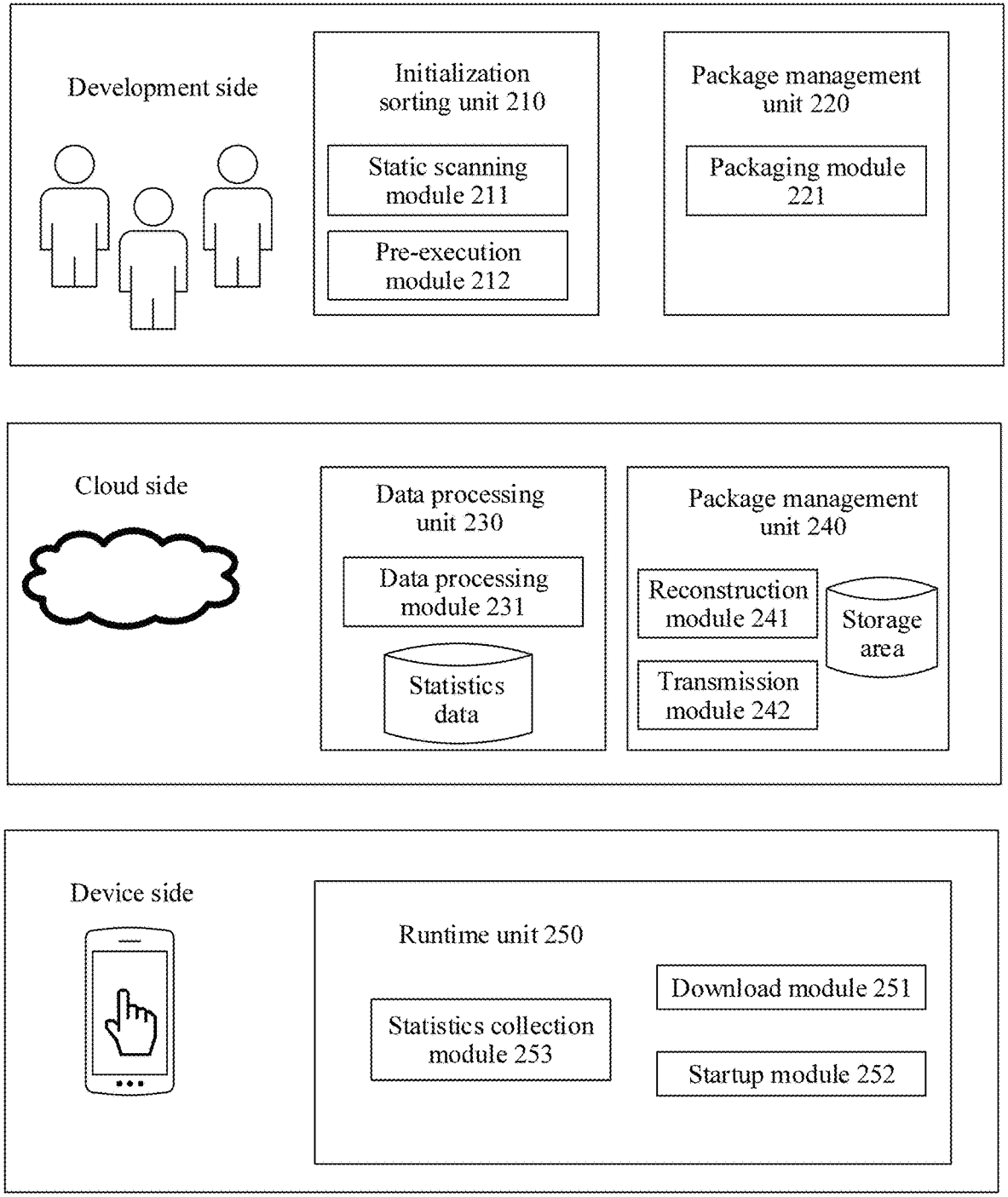
FIG. 2 is a schematic diagram of deployment of the solutions according to the embodiments.

FIG. 2 is a schematic diagram of a system architecture according to the embodiments. Some of the solutions provided in the embodiments are implemented/deployed on a terminal device (on a device side), and may be used as a part of a terminal product, some of the solutions are implemented/deployed on a server on a cloud side, and may be used as a part of a cloud product, and some of the solutions are implemented/deployed in an integrated development environment (IDE), and may be used as a part of an IDE product.

As shown in FIG. 2, a development side includes an initialization sorting unit 210 and a package management unit 220, where the initialization sorting unit 210 further includes a static scanning module 211 and a pre-execution module 212, and the package management unit 220 further includes a packaging module 221. Further, first, a developer develops an application, and generates a plurality of files related to the application. Then, the plurality of files is compressed to form compressed files, and the initialization sorting unit 210 sorts the plurality of compressed files (or directly sorts the plurality of files without compression). Finally, the package management unit 220 packages the plurality of files into a file package based on a sorting result or a sorting factor output by the initialization sorting unit, and releases the file package to the server on the cloud side. The server on the cloud side stores the file package, and waits for an obtaining request from the device side or actively sends the file package to the device side in a scenario.

It should be noted that compression is optional. The file package is an aggregation of the plurality of files (the files are sequentially spliced into one file). If compression needs to be performed, in a streaming download mode, usually, each file is separately compressed and then spliced. Correspondingly, during usage, each time a file is downloaded, the file is decompressed.

The server on the cloud side includes a package management unit 240 and a data processing unit 230, where the package management unit 240 further includes a transmission module 242 and a reconstruction module 241, and the data processing unit 230 includes a data processing module 231. A runtime unit 250 is deployed on the terminal device on the device side, and the runtime unit 250 includes a download module 251, a startup module 252, and a statistics collection module 253. After the developer completes the development of the application and deploys the application on the cloud side, the device side and the cloud side continue to cooperate to complete the method provided in the embodiments.

The application developer develops, in an IDE, the application that can be quickly opened on the terminal device, and packages the application and uploads the application to the server on the cloud side. After the user sends, on the terminal device, an instruction for starting the application, the terminal device is triggered to download the file package of the application from the corresponding server on the cloud side. After the file package is downloaded, the terminal device loads a resource required for initial startup of the application, and displays a first page of the application. In the solutions provided in the embodiments, in an application download process, the terminal device preferentially downloads the resource required for initial startup of the application such that the application can be started without waiting for completion of downloading the entire file package, thereby increasing an application startup speed, and improving user experience.

A package splitting solution in other approaches has many disadvantages. For example, the developer needs to analyze an application structure and logic based on a package splitting principle, to divide a program. When service logic is complex, a package may not be split as expected. The package splitting solution has constraints on a multi-invoking relationship, and voluntary access cannot be implemented between split subpackages. The splitting solution is not universal, and needs to be redesigned for different formats such as a small game package and a resource package. Corresponding design, modification, and the like are required on the IDE, the server on the cloud side, and the like to suit package splitting. However, in the solutions, package splitting is not performed, but a file required for starting the application (to be specific, a file with a usage probability of 100%) may be preferentially transmitted in a streaming download manner, thereby avoiding the disadvantages of the package splitting solution, and meeting a quick startup requirement of a user.

Figure 3:
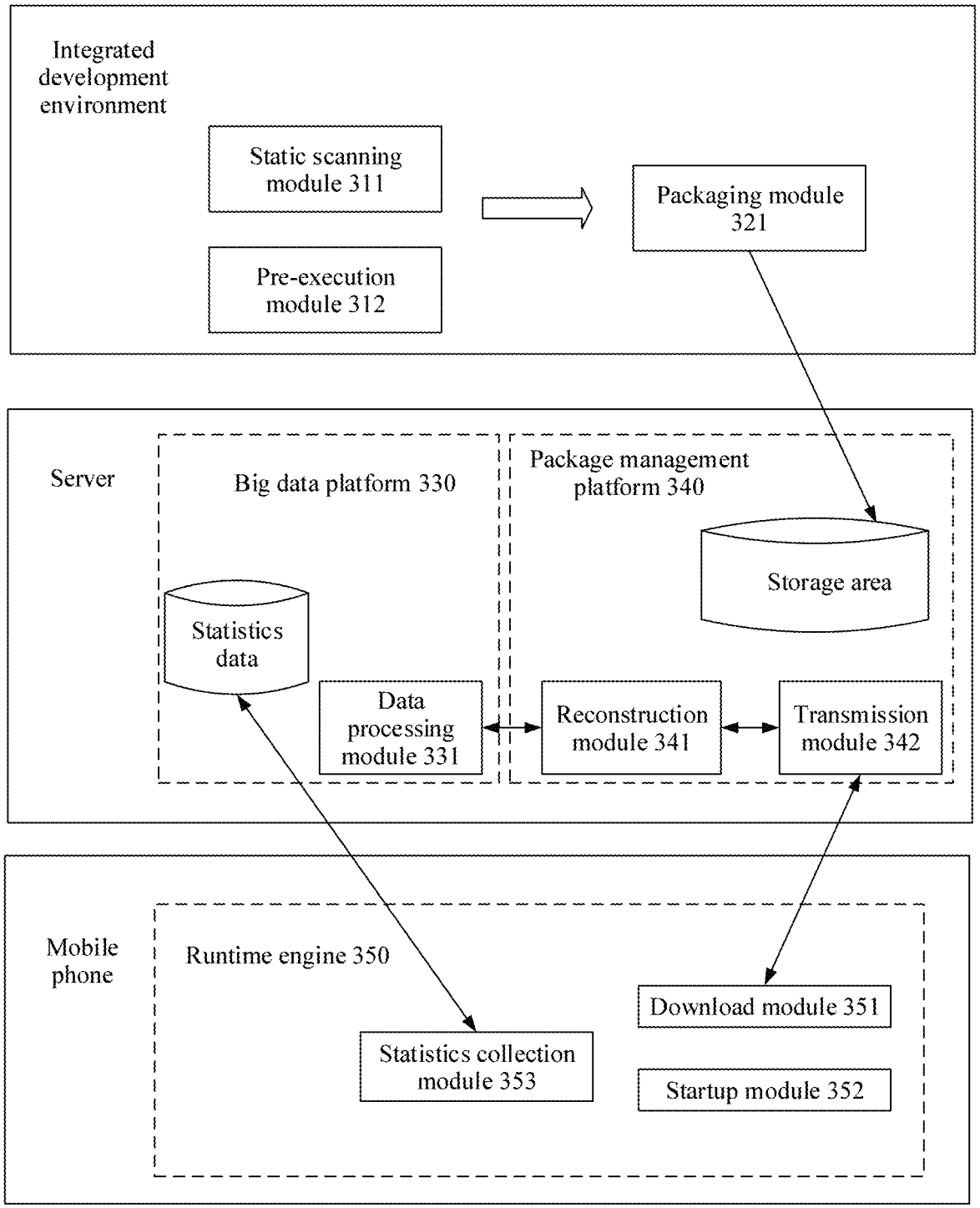
FIG. 3 is a schematic diagram of an operation procedure of the solutions according to the embodiments.

FIG. 3 shows a deployment and implementation mode in a startup and loading scenario of a mobile phone application provided in the embodiments, and mainly shows internal and external components of each system related to the embodiments and a mutual relationship between the components. Related apparatuses may be classified into three types: one is deployed inside an IDE and provided as a tool for a developer to use, one is deployed on a server as a part of a cloud side, and one is deployed on a mobile phone as a part of a runtime engine.

As shown in the figure, a statistics collection module 353, a download module 351, and a startup module 352 are deployed in a runtime engine 350 of the mobile phone. A data processing module is deployed on a big data platform 330 of the server. A reconstruction module 341 and a transmission module 342 are deployed on a package management platform 340, where the package management platform 340 and the big data platform 330 may be deployed on a same server, or may be deployed on different servers. A static scanning module 311, a pre-execution module 312, and a packaging module 321 are deployed in an IDE on a development side.

The static scanning module 311 is a part of an IDE tool chain. The static scanning module 311 is configured to perform static scanning on a plurality of files related to the application, to statically analyze a reference relationship between the plurality of files, and use the reference relationship as one of inputs to the packaging module 321. The pre-execution module 312 is also a part of the IDE tool chain. The pre-execution module 312 is configured to perform pre-execution on the application, to dynamically analyze the reference relationship between the plurality of files, and use the reference relationship as another input to the packaging module 321.

The packaging module 321 is a part of the IDE tool chain, and is configured to package the plurality of files into a file package and send the file package to the server on the cloud side. The packaging module 321 generates an initial sequence of the files in the file package based on execution results of the static scanning module 311 and the pre-execution module 312.

The statistics collection module 353 is configured to collect information related to running of the application on the mobile phone, including an opening sequence of the files and a quantity of opening times of each file, and the like, and personalized information such as a location of the application when the application is running and an identifier of a user. In the embodiments, the statistics collection module 353 uploads the collected information to the server for storage such that the data processing module 331 on the server performs statistical analysis on the data.

It should be noted that a same terminal device may allow different users to log in and use. Therefore, the identifier of the user refers to information that uniquely identifies a terminal device user, and may be a user name, a phone number, identity information, or the like.

The data processing module 331 is located on the server on the cloud side, and is configured to analyze the data reported by the statistics collection module 353. Further, the cloud server may also have a statistics collection capability, to collect data of various types of mobile phones on the device side, and the data processing module 331 also processes the data. A data processing result is fed back to the reconstruction module 341.

The reconstruction module 341 is configured to dynamically re-sort the plurality of files in the file package. A re-sorting basis may be a feedback from the data processing module 331, or may be a feedback from a transmission module 342. The re-sorting is performed based on an initial sequence in the file package. A sequence of the files is continuously and dynamically updated based on continuous feedbacks of the data processing module 331 and/or the transmission module 342.

Further, the reconstruction module 341 may further generate personalized sequences for different mobile phones based on personalized information reported by each mobile phone.

It should be noted that, if each file in the file package is compressed using a compression technology, the re-sorting is performed per compressed file, and decompression is not required in the re-sorting process, but only a splicing sequence of the files in the file package is adjusted.

In some embodiments, re-sorting may be rearranging all the files, to generate a new rearranged file package, in some other embodiments, re-sorting may be generating a new sorting result, and the transmission module reads the files from the file package based on the sorting result, and puts the files into a transmission buffer, and waits the files to be transmitted to the device side.

The transmission module 342 is used by the server to transmit data to the mobile phone. The transmitted data is formed by sequentially splicing the files in the file package, and the arrangement sequence is generated by the reconstruction module 341.

In a download process, the download module 351 may feed back scheduling information to the transmission module 342, where the scheduling information includes information (for example, a file identifier) about a file that needs to be scheduled. Further, the scheduling information may further include information used to indicate a priority of the file in a file stream, to request to raise the priority of the file in the file stream. After receiving the scheduling information, the transmission module 342 needs to adjust the priority of the file in real time such that the file is downloaded as soon as possible.

It should be noted that the scheduling information is usually sent only when a priority (or priorities) of one file (or more files) needs (or need) to be raised. However, in this application, it is not excluded that in some cases, a purpose of sending the scheduling information by the mobile phone is to instruct the server to lower a priority (or priorities) of one file (or more files). If both the two cases are included, the scheduling information may further include information used to indicate priority raising or lowering.

The download module 351 is configured to initiate receiving the file package of the application. The download module 351 successively receives, based on the sequence, the files delivered by the transmission module 342. After completely downloading files required for starting the application, the download module 351 instructs the startup module 352 to start the application.

The startup module 352 is responsible for starting the application. The startup module 352 starts the application after receiving the instruction from the download module 351.

Figure 4:
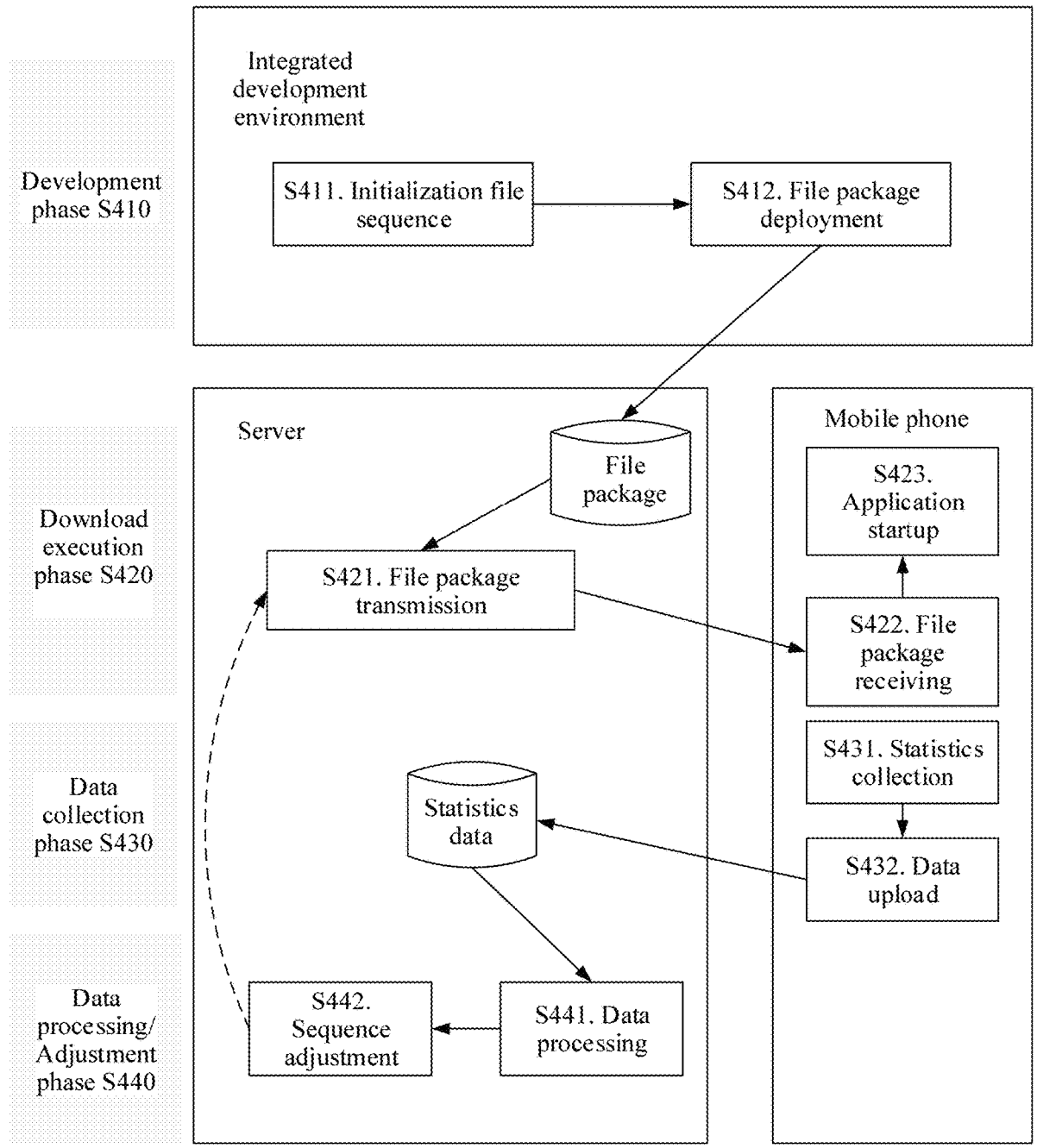
FIG. 4 is a schematic diagram of a method procedure of the solutions according to the embodiments.

FIG. 4 is a schematic diagram of an overall procedure of an application download solution according to the embodiments. The solution mainly includes a development phase S410, a download execution phase S420, a data collection phase S430, and a data processing/adjustment phase S440.

In the development phase S410, initial sorting of all files in a file package and deployment of the file package need to be completed. Further, an initial sorting tool collects information about the files in the file package, and sorts the files in the file package based on the collected information (S411), where the sorting is referred to as initial sorting in the embodiments. The file package obtained after the initial sorting is uploaded to a storage area of a server, that is, the file package is deployed (S412).

In the download execution phase 420, a process of downloading the file package from the server to a mobile phone needs to be completed. After the file package is deployed in the storage area of the server, the mobile phone may send a download request for the file package of the application to the server. After receiving such a request, the server arranges all the files into a file stream, and returns the file stream to the mobile phone (S421). The files in the file stream are arranged based on the initial sequence. After receiving the file stream returned by the server, the mobile phone reads the files in sequence and writes the files into a buffer (S422). When files required for starting the application are buffered, the application may perform a startup process (S423). Subsequent files in the file stream continue to be transmitted.

Before the entire package is downloaded, if a user accesses a file that has not been completely downloaded, the mobile phone immediately initiates a network request to the server, and the server preferentially transmits the file in real time. After the file is downloaded, the mobile phone continues to execute a subsequent procedure.

In the data collection phase S430, collection of all data required in a system running process needs to be completed. FIG. 4 shows only an example of the data collection phase. Actually, a data collection operation in this phase may be performed in any phase during running of the server or a mobile phone system. For example, in a phase in which the mobile phone requests to download the files, the mobile phone may collect personalized information (such as a user identifier (ID), location information, and an ID of a specific file) of the user. In a phase in which the mobile phone uses the files, the mobile phone may collect information such as a quantity of access times of each file and an access sequence of the files. When a priority of a file in the file stream is adjusted, the server or the mobile phone may collect information about the dynamical adjustment.

Data collected by the server may be directly stored in a data storage area of the server. Data collected by the mobile phone needs to be uploaded to the server (S431 and S432), and is finally aggregated and stored in a data storage area on a cloud side (a storage area identified by "statistics data" in FIG. 4). The data collected by the mobile phone may be directly uploaded to the server, or may be processed in a specific form and then uploaded to the server. The data storage area and the storage area (a storage area identified by "file package" in FIG. 4) in which the file package is stored may be a same storage area or may be different storage areas in an actual implementation. There may be a plurality of specific storage manners. In FIG. 4, the two storage areas are drawn separately only for ease of understanding. For how to store and where to store the data and the file package actually, refer to any data storage manner. This is not limited in the embodiments.

In the data processing/adjustment phase S440, processing on the statistics data in the data storage area needs to be completed (S441), and a sequence of the files are adjusted based on a processing result (S442). After a specific amount of data is collected in the data collection phase S430, the server analyzes some or all of the collected data, and dynamically adjusts the existing sequence based on an analysis result such that the file sequence better suits a user requirement, thereby reducing a possibility of the foregoing priority adjustment. The dynamically adjusted sequence is used for subsequent transmission of the file package (S421).

The sequence may be dynamically adjusted in real time or non-real time. In a case of real-time adjustment, a data processing operation is triggered immediately after the data in the data storage area is updated, a new file sequence is calculated, and the new sequence is directly applied after a download request for the file package is received. In a case of non-real-time adjustment, the data processing module reads data from the data storage area at a time interval. When the data is updated, data processing is performed to generate a new file sequence, and when the file package is accessed, the new sequence is applied.

The following describes in detail an application download method provided in the embodiments.

Figure 5:
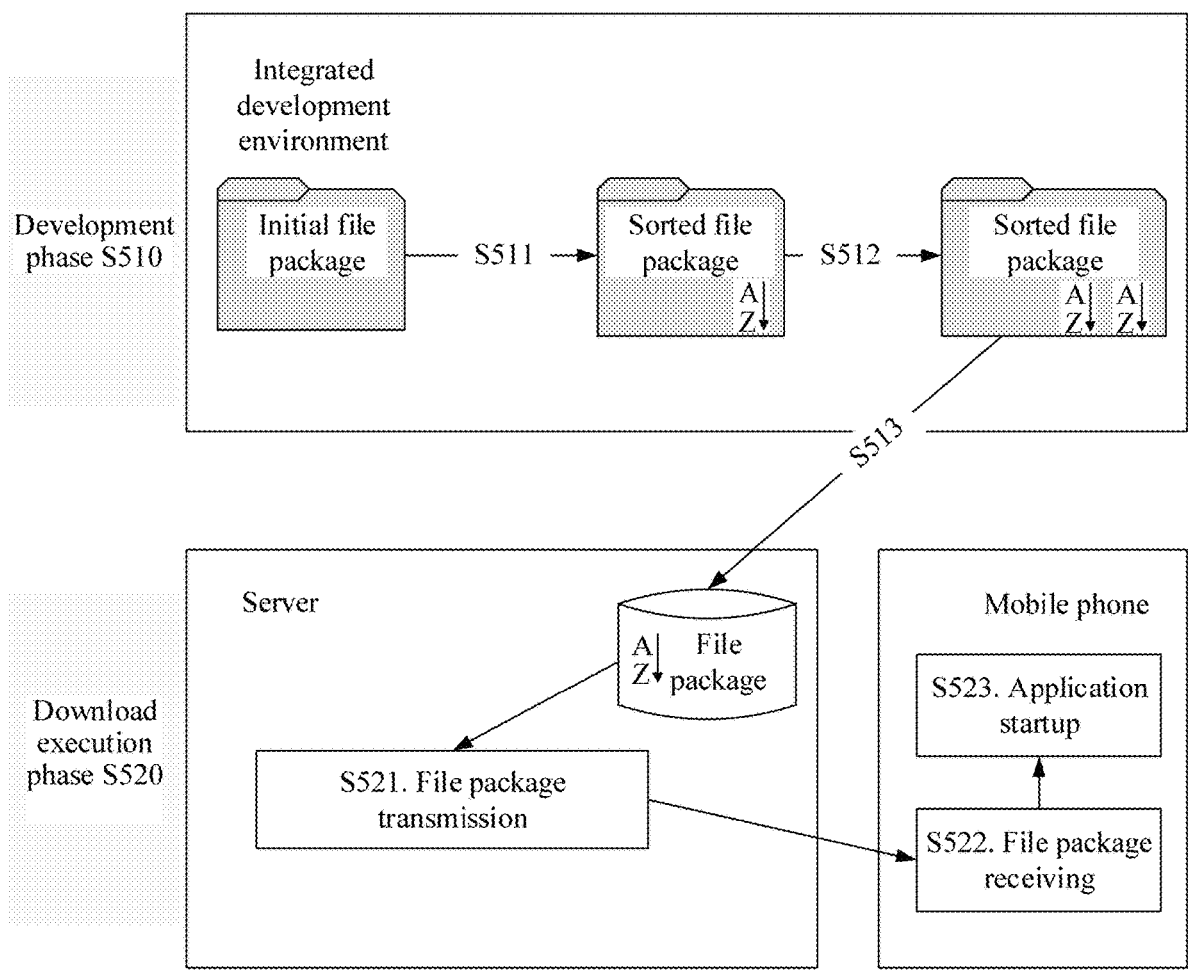
FIG. 5 is a schematic diagram of a method procedure of the solutions according to the embodiments.

FIG. 5 shows a method for a developer to perform initial sorting on a file package based on an IDE compilation process in a development phase S510, to enable the file package to have a relatively proper sequence at the beginning of deployment of the file package.

In the development phase S510, initial sorting of all files in the file package and the deployment of the file package need to be completed. In this phase, the files in the file package are sorted based on a result of static scanning (S511) and a result of application pr-execution (S512).

Further, first, an initial file package that has not been sorted is input to an initial sorting tool (an executable script). The initial sorting tool performs text static scanning on the files in the file package one by one, identifies key statement information such as a page redirection application programming interface (API) and a file reference, and records the key statement information as scanning records. The scanning records are read sequentially. An entry file is used as a root node, and a referenced file in each entry is set as a child node of a referencing file. After the scanning records are analyzed, a complete reference relationship tree is built.

The page redirection API is an API at a code level and is used for redirection from one page to another page. For example, NavigateTo ("page2") indicates redirecting to a page 2, and indicates that a current file references a page2.js file.

A file reference statement is a statement that indicates a reference relationship between files. For example, Image.src="path/to/image.png" means that an image.png file is referenced by a current file. Require ("path/to/foo.data") means that a foo.data file is referenced by a current file. The current file is a file including the statement.

It should be noted that, static scanning is usually scanning a full text of each file. Certainly, some file types that are unnecessary for sorting analysis may be skipped, for example, an image type (which does not reference another file).

However, static scanning only applies to a static string mode, and does not apply to a dynamic processing case.

The pre-execution (S512) includes starting an application in a simulator in an IDE, to simulate an operation on the application (for example, the simulation may be implemented based on monkey testing Monkeytest), collecting dotting statistics when the page redirection API is executed and when a local file is read, and then recording the statistics as reference records. After the simulation operation is completed, the reference records are read in sequence, the reference relationship tree is updated based on the reference records and the reference relationship tree generated through static scanning. After all the reference records are analyzed, the reference relationship tree is refreshed. A refreshed reference relationship tree is traversed, and initial file sequence is generated, where a traversal method may adopt, for example, breadth-first traversal. Then, the files in the file package are sorted based on the generated file sequence, and a new file package is generated and is deployed in a storage area on a cloud side.

Monkeytest is a means for automated testing in an ANDROID system, and is used to simulate various user operations such as key input, touchscreen input, and gesture input to test stability and compatibility of a target system.

In a download execution phase S520, a process of downloading the file package from a server to a mobile phone is mainly completed. This phase is similar to the foregoing S420 phase in the embodiments. For S521 to S523 included in this phase, correspondingly refer to the foregoing S421 to S423. Details are not described herein again.

It should be noted that, before the file package is completely downloaded, if a terminal device accesses a file that has not been completely downloaded, the terminal device needs to immediately initiate a network request to the cloud side, and the cloud side may raise in real time a priority of the file in a file stream that has not been completely transmitted such that the file is preferentially downloaded. Further, in an implementation, the cloud side may not change the sequence of the locally stored files, but after receiving a file scheduling request, moves a file to be scheduled to the top of a buffer in which files have not been transmitted are located, and preferentially transmit the file.

According to the foregoing method, the proper initial file sequence is generated in a static and dynamic combination manner, and the plurality of files in the application are sequentially provided for the terminal device in a streaming download manner such that the terminal device can obtain, as soon as possible, the files required for running the application, thereby improving a running speed of the application and improving user experience.

Further, the embodiments further provide a sequence adjustment method based on big data statistics. Runtime information related to an application is collected, a sequence of files in a file package on a cloud side is dynamically adjusted such that the file sequence on the cloud side can better suit a usage habit of a user. By adjusting the sequence, a file that is most likely to be used by a device side can be downloaded as soon as possible in order to reduce a waiting time for downloading the file, improve a running speed of the application, and improve user experience.

Figure 6A:
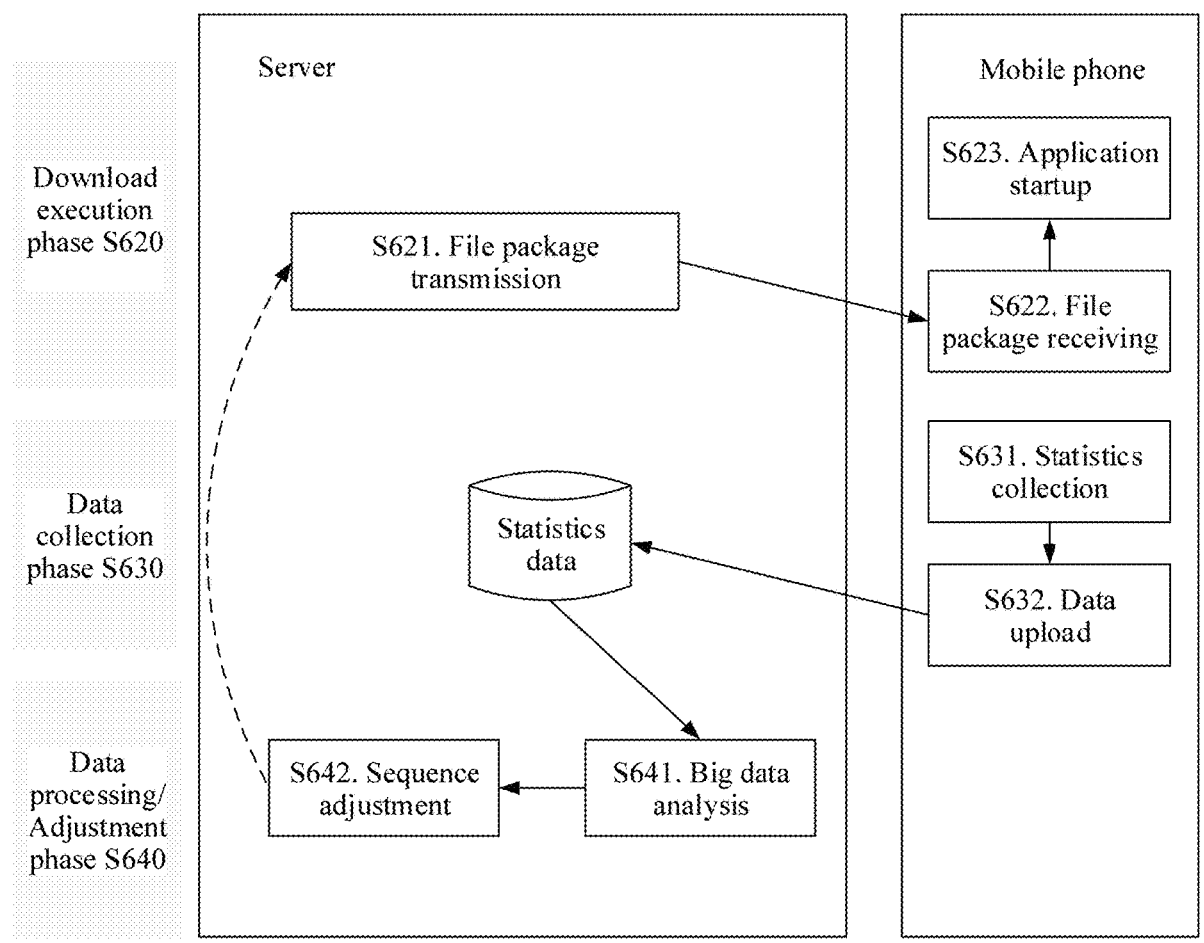
FIG. 6A is a schematic diagram of a method procedure of the solutions according to the embodiments.

FIG. 6A is a schematic flowchart of a sorting method based on big data statistics. A download execution phase S620 is similar to the foregoing S420 and S520 phases in the embodiments. For S621 to S623 included in S620, correspondingly refer to the foregoing S421 to S423 and S521 to S523. Details are not described herein again.

In a data collection phase S630, collection of data required for adjusting a sequence needs to be completed. A data collection operation in this phase may be performed in any phase during system running. On a mobile phone side, the statistics collection module (353 in FIG. 3) may collect information such as a quantity of startup times of an application, a quantity of access times of each file, and an access sequence of files (S631). Some information may be directly collected and some information may be obtained through an analysis processing on the collected information.

Further, code for dotting statistics is inserted at a location of a file access function, and information such as a name, a time, and a current page file (to be specific, a file that references an accessed file, or an upper level in a reference relationship) of the accessed file is recorded, to obtain the foregoing various information.

The data collected by the mobile phone is sent to the server (S632). After the data reaches a specific amount, the server completes big data analysis (S641), and adjusts the file sequence in the file package of the application based on a result of the big data analysis (S642). Big data analysis mainly includes three processes: cleaning data, calculating an access probability of each file, and calculating the file sequence.

(1) Cleaning data: In a process from starting the application to closing the application, a quantity of access times of each file is kept once at most. In dependency relationships with a same entry point, a longest relationship is reserved. Referring to an example diagram of a file dependency relationship in FIG. 6B, in a process from starting the application to closing the application, dependency relationships between the files may be recorded as the following three pieces:

index.js→p3.js→p1.j s;
index.js→p3.js; and
p3.js→p1.js.

After the data cleaning, only the first piece index.js→p3.js→p1.js is kept.

Figure 6B:
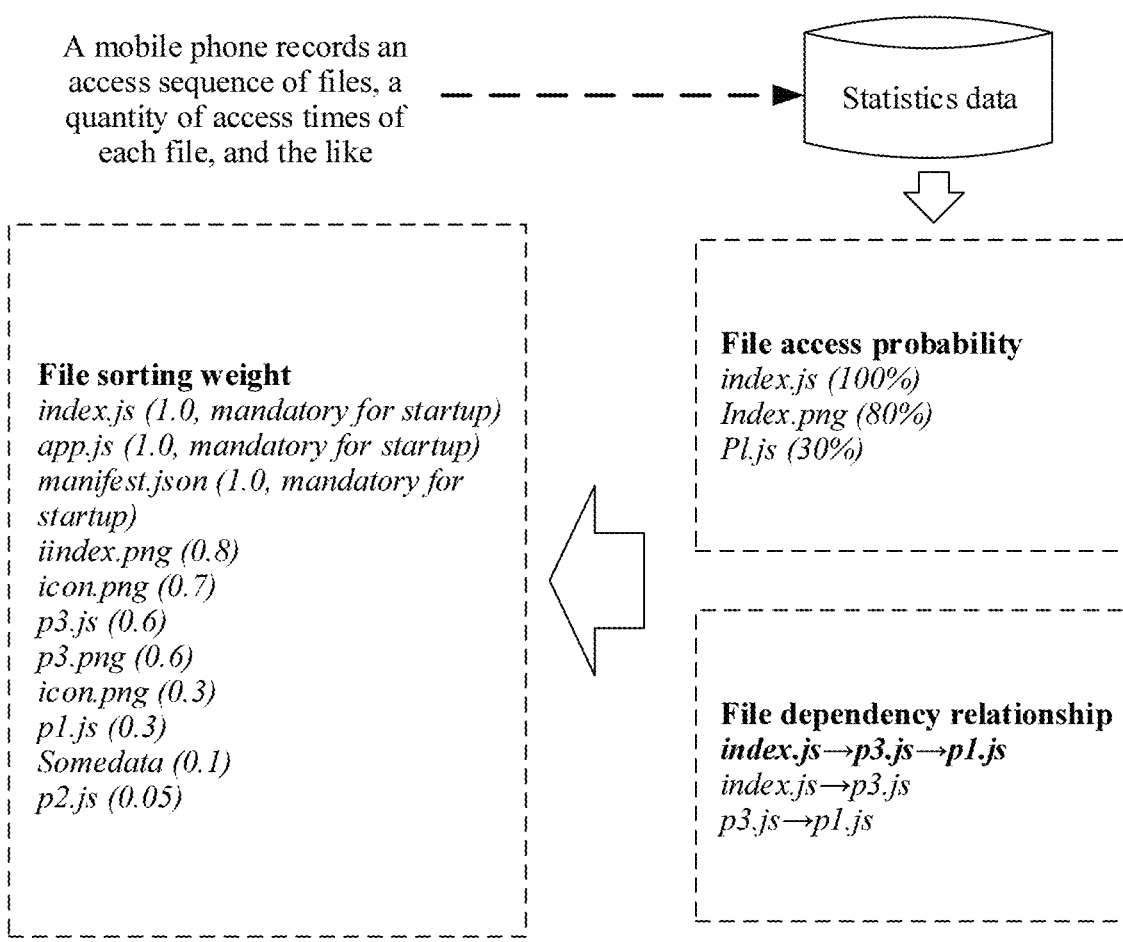
FIG. 6B is an example diagram of file sorting of the solutions provided in the embodiments.

It should be noted that FIG. 6B provides some examples of file names as identifiers of the files. In another embodiment, the identifier of the file may further include a storage path of the file.

(2) Calculating a file access probability: An access probability of a file F=A total quantity of access times of the file F/A total quantity of startup times of the application. The file access probability is a probability that the file is accessed. The total quantity of access times of the file is a total quantity of times that the file is accessed. FIG. 6B shows examples of access probabilities of three files.

(3) Calculating a file sequence:

(a) The file access probability is converted into a sorting weight, and the files are sorted in descending order of weights. A maximum value is 1, indicating a file mandatory for startup. Usually, a higher access probability of a file indicates a larger weight of the file, but the access probability is not a unique factor that affects the weight. For example, the foregoing real-time file scheduling request sent by a device side in a file package download process also affects the weight of the file.

(b) The collected data also includes the file reference relationships. Because the data is obtained by collecting a large amount of actual data, almost all reference relationships are included. Therefore, a reference relationship tree is generated based on the file reference relationships in the data. There may be a plurality of root nodes in the reference relationship tree, and the plurality of root nodes are considered as peer nodes.

(c) For files with a same weight, a file with a larger total quantity of access times (before cleaning) has a higher priority.

It should be noted that the big data analysis process described above is only an example, and there are a plurality of big data analysis methods, especially a specific data cleaning method, a specific data computing or analysis method, or the like. Any big data analysis method that can optimize the file sequence provided in this application to improve an application startup/running speed can be applied to the method provided in this application.

In the method provided in the embodiments, personalized file sorting optimization may be further performed for different types of terminal users. For example, for some types of applications, users of the applications are grouped into a plurality of age groups based on ages, and big data analysis is separately performed on users of different age groups, to optimize file sequences for the users of different age groups, to adapt to different application usage requirements. Alternatively, optimization is separately performed for different types of applications, and so on.

Usage information of the user for the application is collected, and a file sequence is optimized based on the big data analysis method such that the file sequence can better suit a usage habit of the user, thereby further improving efficiency of starting/running the application.

Figure 7:
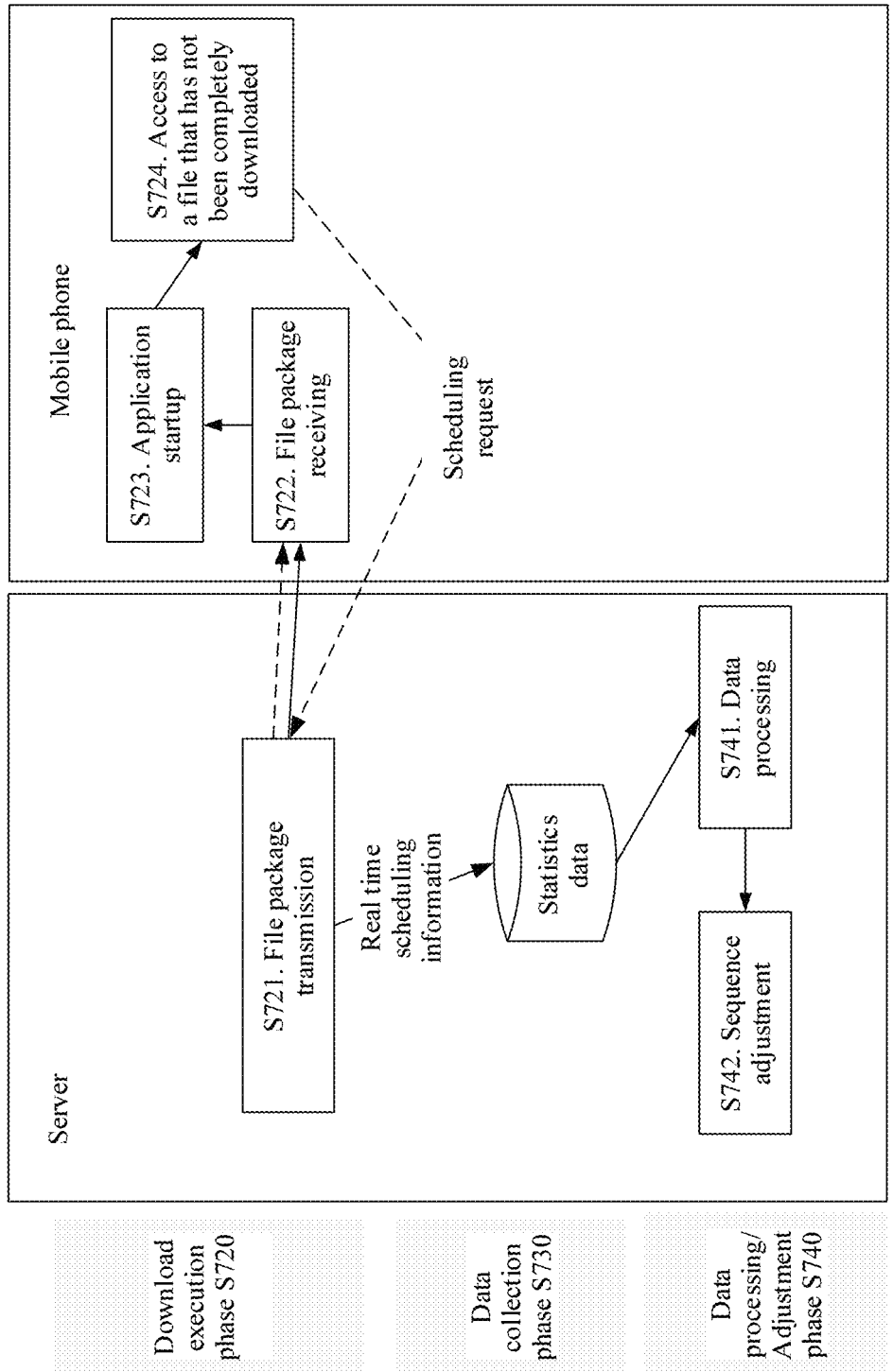
FIG. 7 is a schematic diagram of a method procedure of the solutions according to the embodiments.

Further, referring to FIG. 7, the embodiments further provide a method for dynamically adjusting a sequence in a file package based on real-time scheduling information, to continuously adjust a file structure to obtain a better sequence in a download process.

As shown in FIG. 7, in a download execution phase S720, after a file required for starting an application is downloaded, the application may be started (S721 to S723), and remaining files continue to be downloaded after the application is started. Before the file package is completely downloaded, if the application accesses a file that is not completely downloaded (S724), a real-time adjustment procedure is performed.

In the embodiments, access to all the files is implemented using an asynchronously invoked API. When the application invokes the API, if a corresponding file is in a buffer (indicating that the file has been downloaded), the file is directly read and a callback function is executed. If the file does not exist, a file name and a callback function are stored, another network thread is created, and a current invocation returns. A mobile phone initiates a scheduling request to a server using the created network thread, to notify the server of the name of the required file.

After receiving the scheduling request, the server may respond in two manners. (1) Raise a priority of the file to the foremost in a file stream that has not been completely transmitted, and preferentially download the file. (2) Return the file in a response to the current request using another thread or process.

After the mobile phone initiates the scheduling request to the server, each time a file is downloaded, the mobile phone detects whether a name of the file is the same as that of the locally stored file (the requested file), and if yes, executes the stored callback function to return the file content.

The real-time scheduling information also needs to be collected such that the server can optimize a file sequence based on the information. Therefore, when the server receives the scheduling request and implements scheduling, the server is responsible for recording the file name of the file involved in this scheduling. Further, code for data collection is inserted to the end of a function used by the server to respond to the scheduling request, to record information such as a time and the name of the file requested by the scheduling request.

After the real-time scheduling information is collected, a priority of the corresponding file needs to be dynamically adjusted based on the real-time scheduling information. The sequence many be adjusted in real time or non-real time. In a case of real-time adjustment, a new file sequence is immediately calculated once the collected data is updated. After receiving a request for downloading the file package, the server directly applies the new sequence. In a case of non-real-time adjustment, a threshold (for example, 1000) of a quantity of scheduling times may be set for triggering the adjustment, and whether the threshold is reached is detected at an interval (for example, 10 minutes). After the set threshold is reached, adjustment is performed on file sorting weights according to a preset configuration. For example, if a quantity of times that the file A is scheduled under request reaches 1000, a weight of the file A is adjusted. New file weight=Old file weight*1.1. After the weights are updated, the file sequence is updated based on the weights.

It can be learned that, a usage habit of a user for the application may change, and a sorting result obtained based on only historical usage information may become inaccurate. Using the method provided in the embodiments, the file sequence may be updated based on the real-time scheduling information. Therefore, the files of the application can be sorted based on real-time information of usage of the user on the application such that the sequence better suit the usage habit of the user.

In some other embodiments, the real-time scheduling information may not be used to update the sorting result, or may not be immediately used to update the sorting result. Even so, using the scheduling request sending and response manners described above in the embodiments, a file currently required by the user can be provided to the user in time, meeting a user requirement, and improving user experience.

For another processing process that is not described in FIG. 7, for example, a data collection phase S730, refer to the data collection phase S630 in the foregoing embodiment. Collection of the real-time scheduling information and collection of other runtime information of the application may be used together in the solutions provided in this application. A data processing/adjustment phase S740 is similar to that in the foregoing embodiments, but the processed data in this embodiment includes the real-time scheduling information.

It should be noted that, the real-time scheduling information may be used together with the application runtime information collected in the foregoing embodiment for adjusting the file sequence. For example, scheduling a file A once in real time means that a quantity of access times of the file is increased by 1. In addition, the real-time scheduling information may alternatively be considered separately. For example, after the sequence is adjusted based on the data obtained in the foregoing embodiments, a priority of the file is properly raised based on a quantity of real-time scheduling times of the file A. There is a plurality of specific combination methods, which is not limited in the embodiments.

According to the file download method provided in the embodiments, personalized information of the mobile phone may be further collected in a process of downloading the files by the mobile phone, and the sequence of the file package of the application is adjusted based on the personalized information.

Figure 8:
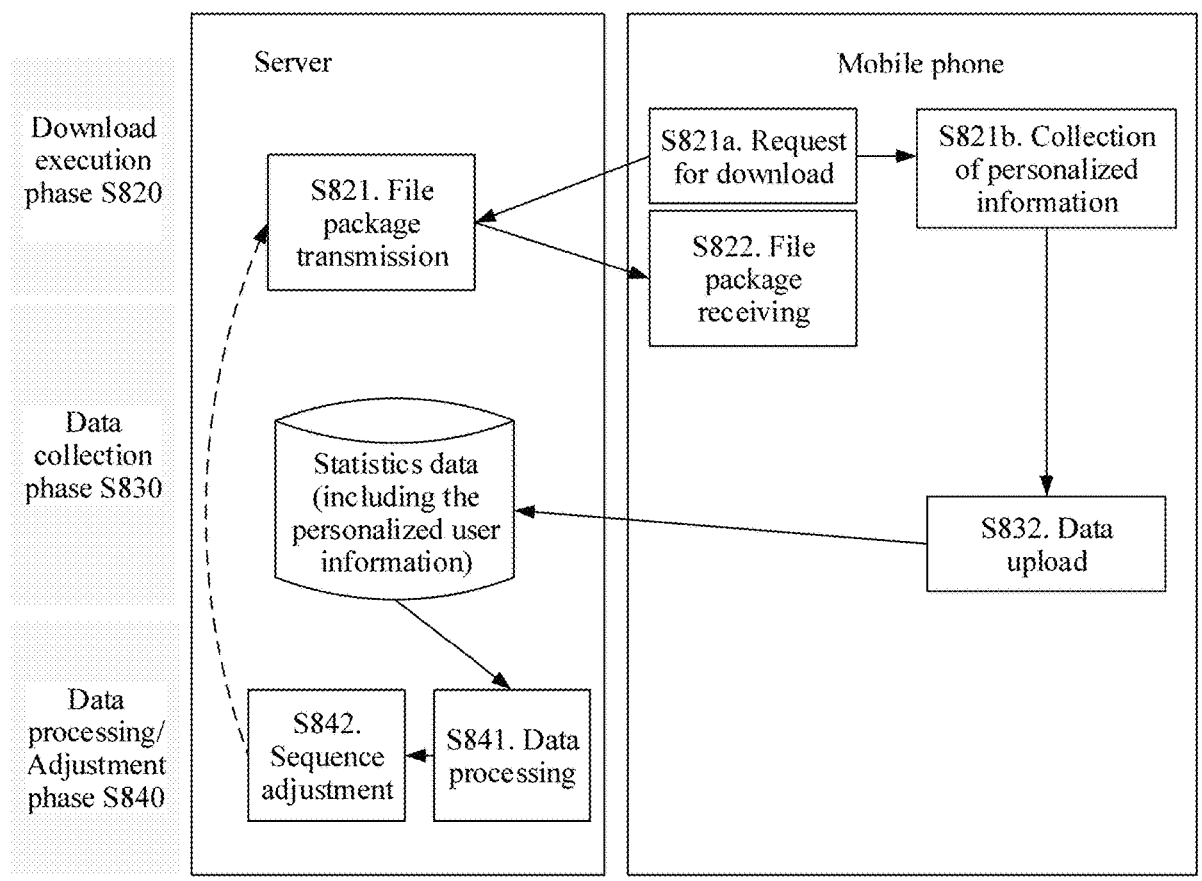
FIG. 8 is a schematic diagram of a method procedure of the solutions according to the embodiments.

FIG. 8 shows a file sequence adjustment method according to the embodiments.

In a download execution phase S820, a mobile phone sends a download request to a server (S821a), the server starts to transmit a file package after receiving the request (S821), and the mobile phone side receives the file package (S822).

Before, during or after files are downloaded, the mobile phone collects personalized information of the mobile phone (S821b), where the personalized information includes information such as a location of the mobile phone when the application is running and an ID of a current user, and uploads the collected information to the server (S832).

The server collects personalized information of different mobile phones, and then may perform a series of data processing with reference to the foregoing data analysis method and the foregoing collected data such as a quantity of file open times, to analyze information such as a correlation between personalized information of a user and an actual used resource (S841). For example, the server may mine, through statistics analysis, a relationship between the location of the mobile phone and a file usage probability. A mining result is, for example:

When the mobile phone is at a location A, a usage probability of a file 1 is 90%, and when the mobile phone is at a location B, a usage probability of the file 1 is 5%.

This indicates that, usage probabilities of a same file in a same application vary depending on a location of the mobile phone. Therefore, when the usage probability of the file 1 is converted into a weight of the file 1, a current location of the mobile phone needs to be considered. For example, if the mobile phone is at the location A, the weight of the file 1 is 0.9, and if the mobile phone is at the location B, the weight of the file 1 is 0.01. Different weights affect a priority of the file 1 in all files, and affect a download sequence of the file 1. It can be learned that the user may have different usage habits when using the mobile phone at different places. Therefore, according to the embodiments, different file download sequences may be provided to better suit the different usage habits, and meet a user requirement.

The server may adjust the sequence of the file package based on a processing result in step S841 (S842). The "adjustment" herein may be modifying a priority of a file in the file package based on a result of the foregoing data processing, and regenerating a file package after sorting, or recording file access probabilities or weights of a file at different locations, to facilitate subsequent selection of one from a plurality of sorting possibilities. In some embodiments, after receiving an application download request from the mobile phone, the server reads information about a current location of the mobile phone from the request, determines a sequence of the files in the file package of the application based on the current location of the mobile phone, and sends the files to the mobile phone based on the sequence.

It should be noted that, sequence adjustment based on the personalized information is usually non-real-time adjustment. A data processing module of the server reads data from a statistics data storage area at a time interval. When the data is updated, data processing is performed to generate a new file sequence based on the personalized information, and when the file package is accessed, a sequence applied varies based on current personalized information of the mobile phone.

It can be learned that in the embodiments, the personalized information such as the location of the mobile phone is taken into consideration for the file sorting such that the file sequence can be more practical. For example, for a same application, usage habits of a user at home may be different from that in a company. Therefore, a probability of accessing each function or page is different. Therefore, a location factor is put into the consideration factor for sorting such that the sequence can better suit usage habits of the user at different places, thereby downloading a file required by the user as soon as possible, reducing a waiting time of the user, and improving user experience.

Figure 9:
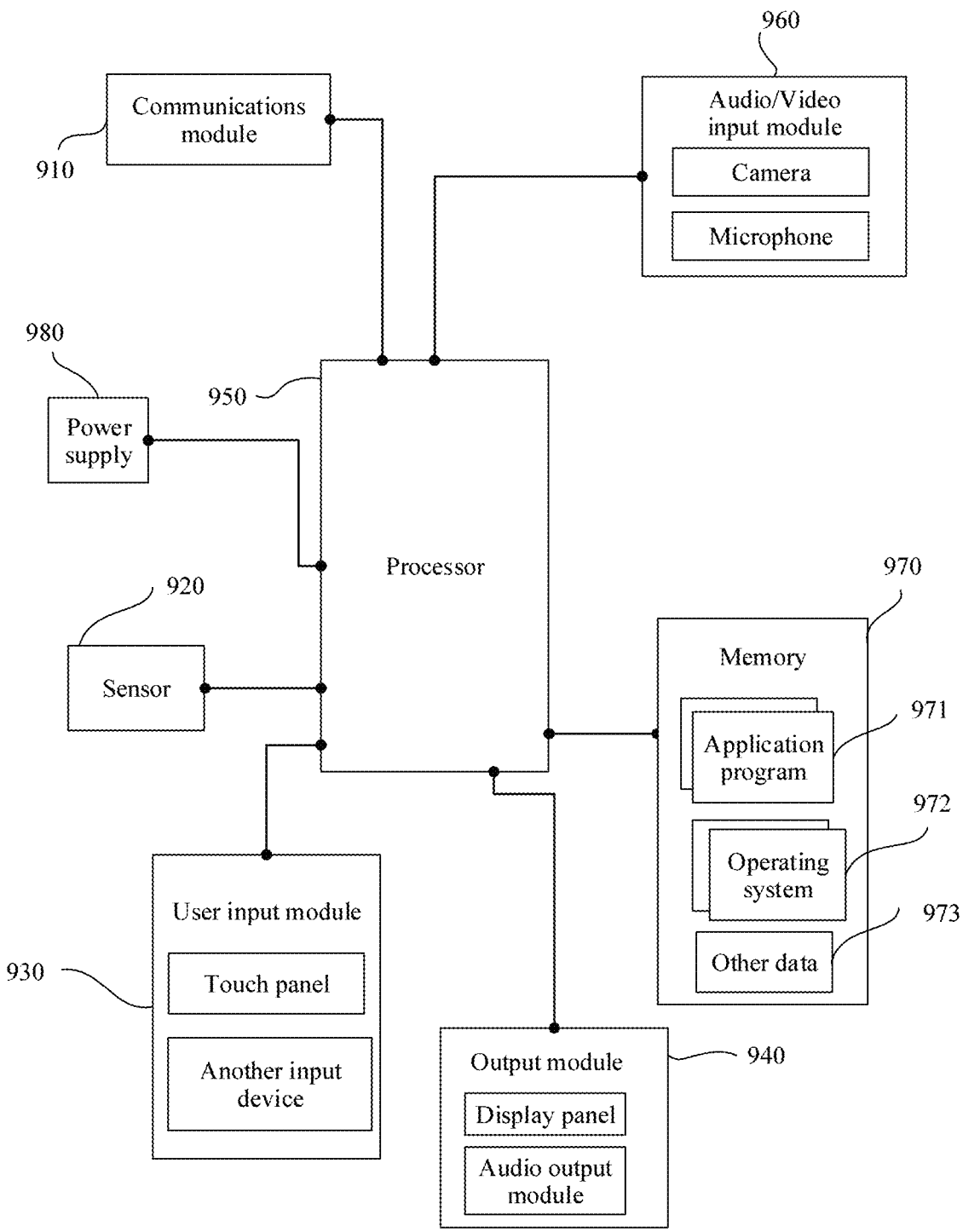
FIG. 9 is a schematic structural diagram of a terminal device according to the embodiments.

FIG. 9 is a schematic structural diagram of a computer system according to the embodiments. The computer system may be a terminal device (referring to various types of terminal devices in FIG. 1). The computer system includes a communications module 910, a sensor 920, a user input module 930, an output module 940, a processor 950, an audio/video input module 960, a memory 970, and a power supply 980.

The communications module 910 may include at least one module that can enable the computer system to communicate with a communications system or another computer system. For example, the communications module 910 may include one or more of a wired network interface, a broadcast receiving module, a mobile communications module, a wireless internet module, a local area communications module, and a location (or positioning) information module. The plurality of modules each have a plurality of implementations in the other approaches, and details are not described one by one in this application.

The sensor 920 can sense a current state of the system, for example, an on/off state, a location, whether the system is in contact with a user, a direction, and acceleration/deceleration. In addition, the sensor 920 can generate a sensing signal used to control an operation of the system.

The user input module 930 is configured to receive entered digit information, character information, or a contact touch operation/contactless gesture, and receive signal input and the like related to user settings and function control of the system. The user input module 930 includes a touch panel and/or another input device.

The output module 940 includes a display panel configured to display information entered by the user, information provided for the user, various menu interfaces of the system, and the like. Optionally, the display panel may be configured in a form of a liquid-crystal display (LCD), an organic light-emitting diode (OLED), or the like. In some other embodiments, the touch panel may cover the display panel, to form a touch display screen. In addition, the output module 940 may further include an audio output module, an alarm, a tactile module, and the like.

The audio/video input module 960 is configured to input an audio signal or a video signal. The audio/video input module 960 may include a camera and a microphone.

The power supply 980 may receive external power and internal power under the control of the processor 950, and provide power required by operations of various components of the system.

The processor 950 may indicate one or more processors. For example, the processor 950 may include one or more central processing units, or one central processing unit and one graphics processing unit, or one application processor and one coprocessor (for example, a micro control unit or a neural network processor). When the processor 950 includes a plurality of processors, the plurality of processors may be integrated on a same chip, or may each be an independent chip. One processor may include one or more physical cores, and the physical core is a minimum processing module.

The memory 970 stores a computer program, and the computer program includes an operating system program 972, an application program 971, and the like. For example, a typical operating system is a system used for a desktop computer or a notebook computer, such as WINDOWS of MICROSOFT or MACOS of APPLE, or a system used for a mobile terminal, such as a LINUX®-based ANDROID® system developed by GOOGLE. In the method provided in the foregoing embodiments, the part on the device side may be implemented in a software manner. As a function of the operating system program 972, the function may be enabled by default, or be enabled under an instruction of a user. Alternatively, the part may be used as an application.

The memory 970 may be one or more of the following types a flash memory, a memory of a hard disk type, a memory of a micro multimedia card type, a card-type memory (for example, an Secure Digital (SD) or eXtreme Digital (XD) memory), a random-access memory (RAM), a static RAM (SRAM), a read-only memory (ROM), a programmable ROM (PROM), an electrically erasable PROM (EEPROM), a magnetic memory, a magnetic disk, or an optical disc. In some other embodiments, the memory 970 may be a network storage device on the Internet. The system may perform an operation such as updating or reading on the memory 970 on the Internet.

The processor 950 is configured to read the computer program in the memory 970, and then perform a method defined by the computer program. For example, the processor 950 reads the operating system program 972, to run an operating system in the system and implement various functions of the operating system, or reads one or more application programs 971, to run an application in the system.

The memory 970 further stores other data 973 in addition to the computer program, for example, an application file and statistics data such as runtime information and personalized user information in this application.

A connection relationship among the modules in FIG. 9 is only an example. A method provided in any embodiment of this application may also be applied to a terminal device using another connection manner. For example, all modules are connected using a bus.

Figure 10:
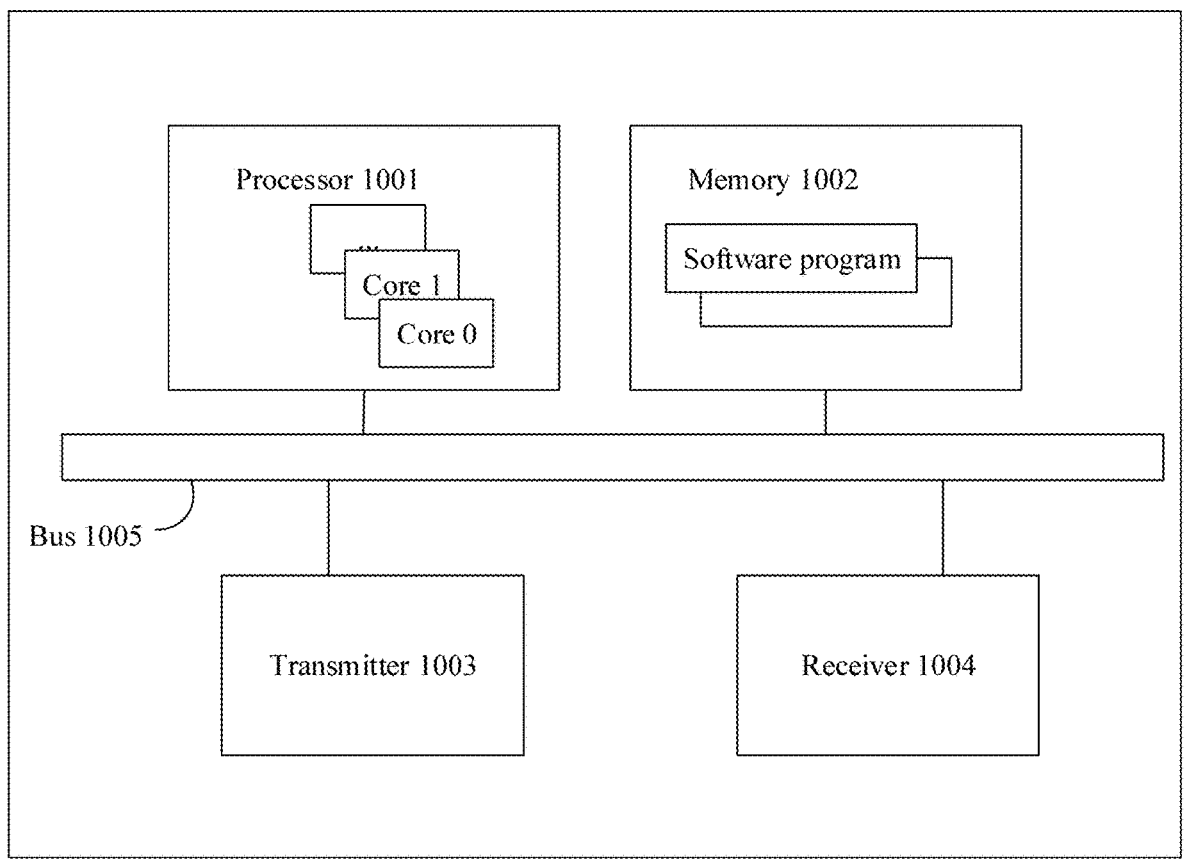
FIG. 10 is a schematic structural diagram of a server according to the embodiments.

FIG. 10 is a schematic structural diagram of a computer system according to the embodiments. The computer system may be a server. The computer system includes a processor 1001, a memory 1002, a transmitter 1003, a receiver 1004, and a bus 1005 connected to the foregoing components.

The memory 1002 is configured to store a software program, and the processor is configured to execute the software program to implement the method implemented on the cloud side in any one of the foregoing embodiments. The receiver 1004 and the transmitter 1003 usually cooperate with a wired or wireless network, and are configured to receive data from the outside of the server, for example, receive runtime information, or send data to the outside of the server, for example, send an application file. The processor 1001 may be a single-core or multi-core processor.

It should be noted that mutual reference may be made to the computer systems in FIG. 9 and FIG. 10.

It should be noted that division into the modules or units provided in the foregoing embodiments is merely an example, and functions of the described modules are merely used as examples for description, and this application is not limited thereto. A person of ordinary skill in the art may combine functions of two or more modules according to a requirement, or divide a function of a module to obtain more modules of a finer granularity, or may use another transformation manner. For beneficial effects of the foregoing embodiments, refer to each other.

For same or similar parts in the foregoing embodiments, mutual reference may be made. Unless otherwise specified, "a plurality of" in this application means two or more than two, or "at least two". A and/or B in this application includes three cases: A, B, and A and B.

The described apparatus embodiment is merely an example. The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be further implemented as one or more communications buses or signal cables. A person of ordinary skill in the art may understand and implement the embodiments of the present disclosure without creative efforts.

The foregoing descriptions are merely some specific implementations of this application, but are not intended to limit the protection scope of this application.

What is claimed is:

1. An application sending method implemented by a server, wherein the application sending method comprises:
   obtaining runtime information of an application that is running or has run on a terminal device, wherein the runtime information comprises access information to a plurality of application files in the application;
   determining a first transmission sequence based on the runtime information; and
   transmitting the application files to the terminal device based on the first transmission sequence.

2. The application sending method of claim 1, further comprising:
   determining an initial sequence based on a reference relationship among the application files; and
   obtaining the application files, wherein the application files comprise the initial sequence.

3. The application sending method of claim 1, further comprising:
   analyzing access probabilities of the application files; and
   determining the first transmission sequence further based on the access probabilities.

4. The application sending method of claim 1, further comprising:
   analyzing a dependency relationship among the application files; and
   determining the first transmission sequence further based on the dependency relationship.

5. The application sending method of claim 1, wherein before completing transmitting the application files, the application sending method further comprises:
   receiving, from the terminal device, a file request requesting to download a requested file that has not been transmitted based on the first transmission sequence; and
   transmitting the requested file in real time based on the file request.

6. The application sending method of claim 5, further comprising adjusting the first transmission sequence to improve a transmission priority of the requested file when a quantity of received file requests exceeds a preset threshold.

7. The application sending method of claim 1, further comprising obtaining personalized user information of the application, wherein the personalized user information comprises one or more of a location of the terminal device, an identifier of a user of the terminal device, or an identifier of a file of the terminal device.

8. The application sending method of claim 7, further comprising determining the first transmission sequence based on the personalized user information and the runtime information.

9. The application sending method of claim 8, further comprising:
   calculating access probabilities, of each of the application files, that respectively corresponding to different locations of the terminal device;
   calculating dependency relationships, among the application files, that respectively corresponding to the different locations of the terminal device; and
   determining, based on the access probabilities and the dependency relationships, a plurality of types of transmission sequences respectively corresponding to the different locations of the terminal device.

10. The application sending method of claim 8, further comprising:
    calculating either access probabilities of each of the application files that respectively corresponding to different locations of the terminal device or dependency relationships among the application files that respectively corresponding to the different locations of the terminal device; and
    determining, based on the access probabilities or the dependency relationships, a plurality of types of transmission sequences respectively corresponding to the different locations of the terminal device.

11. The application sending method of claim 8, further comprising:
    obtaining a current location of the terminal device; and
    transmitting the application files to the terminal device based on a second transmission sequence corresponding to the current location.

12. A computer system comprising:
    a memory configured to store a computer program; and
    a processor coupled to the memory, wherein the computer program causes the processor to be configured to:
      obtain runtime information of an application that is running or has run on a terminal device, wherein the runtime information comprises access information to a plurality of application files in the application;
      determine a transmission sequence based on the runtime information; and
      transmit the application files to the terminal device based on the transmission sequence.

13. The computer system of claim 12, wherein the computer program further causes the processor to be configured to:
    determine an initial sequence based on a reference relationship among the application files; and
    obtain the application files, wherein the application files comprise the initial sequence.

14. The computer system of claim 12, wherein the computer program further causes the processor to be configured to:
    analyze access probabilities of the application files or a dependency relationship among the application files; and
    determine the transmission sequence further based on the access probabilities or the dependency relationship.

15. The computer system of claim 12, wherein the computer program further causes the processor to be configured to:
    receive a file request from the terminal device requesting to download a requested file that has not been transmitted based on the transmission sequence; and
    transmit the requested file in real time based on the file request.

16. The computer system of claim 15, wherein the computer program further causes the processor to be configured to adjust the transmission sequence to improve a transmission priority of the requested file when a quantity of received file requests exceeds a preset threshold.

17. The computer system of claim 12, wherein the computer program further causes the processor to be configured to:
obtain personalized user information of the application, wherein the personalized user information comprises one or more of a location of the terminal device, an identifier of a user of the terminal device, or an identifier of a file of the terminal device; and
determine the transmission sequence based on the personalized user information and the runtime information.

18. An application download method implemented by a terminal device, wherein the application download method comprises:
collecting runtime information of an application, wherein the runtime information comprises access information of a plurality of application files in the application;
sending the runtime information to a server; and
receiving the application files from the server based on a transmission sequence that is based on the runtime information.

19. The application download method of claim 18, wherein the application files comprise an initial sequence that is based on a reference relationship among the application files.

20. The application download method of claim 18, wherein before receiving the application files, the application download method further comprises sending personalized user information to the server, wherein the personalized user information comprises one or more of a current location of the terminal device, an identifier of a user of the terminal device, or an identifier of a file of the terminal device, and wherein the transmission sequence is further based on the personalized user information.

* * * * *